United States Patent [19]
Wood et al.

[11] Patent Number: 5,907,453
[45] Date of Patent: May 25, 1999

[54] ENHANCED CONVECTIVE VOICE COIL COOLING TO IMPROVE THE OPERATIONAL PERFORMANCE OF A DISC DRIVE

[75] Inventors: Roy Lynn Wood, Yukon; Phillip R. Ridenour, Mustang; Steven S. Eckerd, Oklahoma City; Carl Fred Adams, Yukon, all of Okla.

[73] Assignee: Seagate Technology, Inc., Scotts Valley, Calif.

[21] Appl. No.: 08/889,540

[22] Filed: Jul. 8, 1997

[51] Int. Cl.⁶ .................................................. G11B 33/14
[52] U.S. Cl. ...................................... 360/97.02; 360/106
[58] Field of Search ............................... 360/97.01, 97.02, 360/97.03, 105, 106; 369/215, 219, 222

[56] References Cited

U.S. PATENT DOCUMENTS

| 4,780,776 | 10/1988 | Dushkes | 360/97.03 X |
| 5,031,059 | 7/1991 | Yamaguchi et al. | 360/97.03 |
| 5,517,372 | 5/1996 | Shibuya et al. | 360/97.02 |
| 5,696,649 | 12/1997 | Boutaghou | 360/97.03 |

FOREIGN PATENT DOCUMENTS

| 61-196494 | 8/1986 | Japan | 360/97.02 |

*Primary Examiner*—William R. Korzuch
*Attorney, Agent, or Firm*—Crowe & Dunlevy

[57] ABSTRACT

Apparatus and method for enhancing the convective cooling of a voice coil motor (VCM) of a disc drive. A portion of an air flow established by the rotation of a disc of the disc drive is diverted from the disc and is directed through a channel to the VCM. In one embodiment, an air foil is provided to support first and second magnetic paths of the VCM, the air foil having a shroud surface adjacent portions of the circumference of the disc and a diverter surface angularly extending from the shroud surface, the diverter surface diverting the air to the VCM. Alternatively, a base deck of the disc drive is provided with a shroud circumferentially adjacent portions of the disc and the channel extends through the shroud to direct the air from the disc to the VCM.

11 Claims, 8 Drawing Sheets

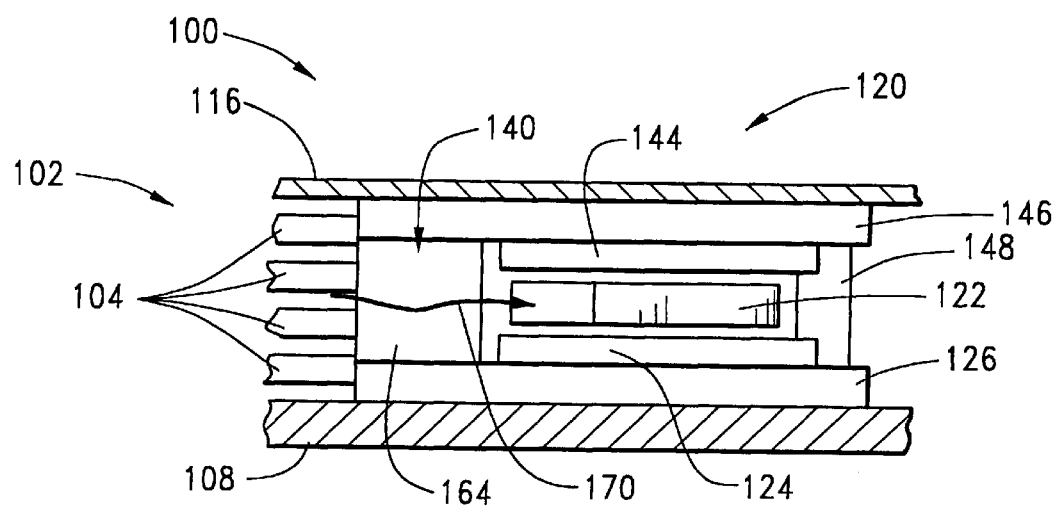
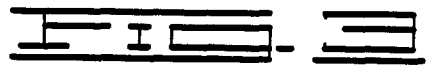
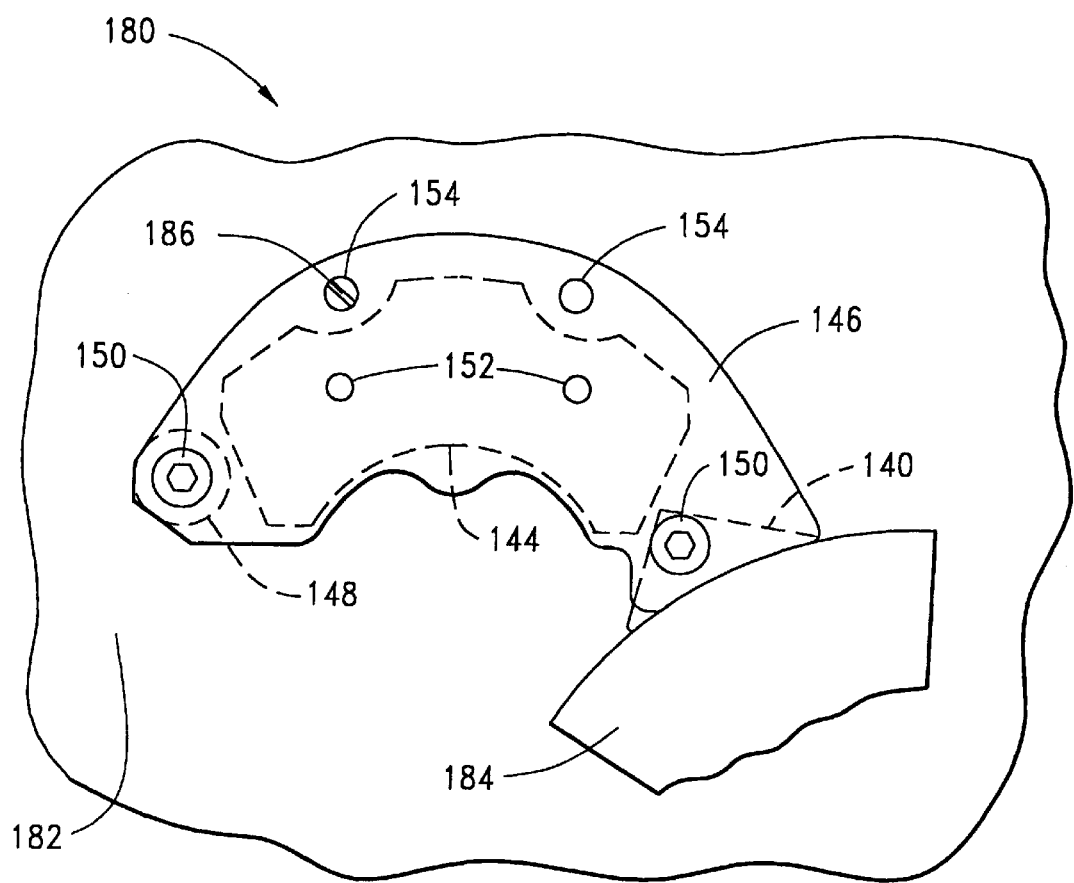
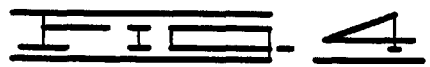

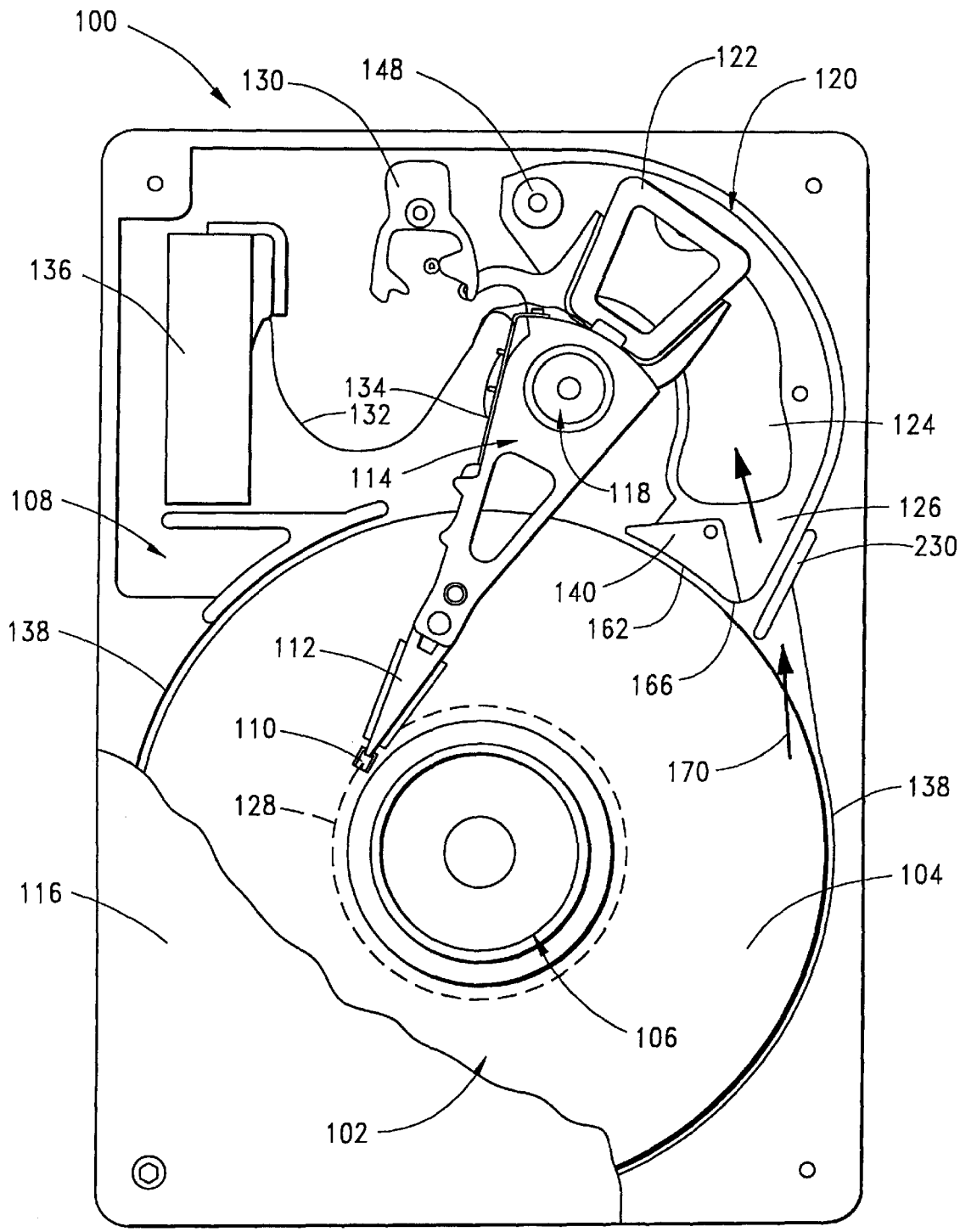
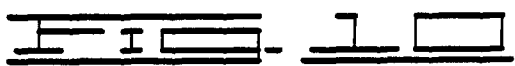

ENHANCED CONVECTIVE VOICE COIL COOLING TO IMPROVE THE OPERATIONAL PERFORMANCE OF A DISC DRIVE

FIELD OF THE INVENTION

The present invention relates generally to the field of disc drive devices and more particularly, but without limitation, to enhancing the convective cooling of the coil of a disc drive voice coil motor so as to improve the operational performance of the disc drive.

BACKGROUND

Modern hard disc drives comprise one or more rigid discs that are coated with a magnetizable medium and mounted on the hub of a spindle motor for rotation at a constant high speed. Information is stored on the discs in a plurality of concentric circular tracks by an array of transducers ("heads") mounted to a controllably positionable actuator for radial movement relative to the discs.

Typically, such radial actuators employ a voice coil motor to position the heads with respect to the disc surfaces. The heads are mounted via flexures at the ends of a plurality of arms which project outward from an actuator body. The actuator body pivots about a cartridge bearing assembly mounted to the disc drive housing and normally disposed thereto at a position closely adjacent the outer extreme of the discs so that the heads move in a plane parallel with the surfaces of the discs.

The voice coil motor includes a coil mounted radially outward from the cartridge bearing assembly, the coil being immersed in the magnetic field of a magnetic circuit of the voice coil motor. The magnetic circuit comprises one or more permanent magnets and magnetically permeable pole pieces. When current is passed through the coil, an electromagnetic field is established which interacts with the magnetic field of the magnetic circuit so that the coil moves in accordance with the well-known Lorentz relationship. As the coil moves, the actuator body pivots about the pivot shaft and the heads move across the disc surfaces.

A closed loop digital servo system such as disclosed in U.S. Pat. No. 5,262,907 issued Nov. 16, 1993 to Duffy et al., assigned to the assignee of the present invention, is typically utilized to maintain the position of the heads with respect to the tracks. Such a servo system obtains head position information from servo blocks written to the tracks during disc drive manufacturing to maintain a selected head over an associated track during a track following mode of operation. A seek mode of operation, which comprises the initial acceleration of a head away from an initial track and the subsequent deceleration of the head towards a destination track, is also controlled by the servo system. Such seek operations are typically velocity-controlled, in that the velocity of the head is repetitively measured and compared to a velocity profile, with the current applied to the coil being generally proportional to the difference between the actual and profile velocities as the head is moved toward the destination track.

It will be recognized that a continuing trend in the industry is to provide disc drives with ever increasing data storage and transfer capabilities, which in turn has led to efforts to minimize the overall time required to perform a disc drive seek operation. A typical seek operation includes an initial overhead time during which the disc drive services its own internal operations, seek time during which the head is moved to and settled on the destination track, and latency time during which the drive waits until a particular sector on the destination track reaches the head as the discs rotate relative to the heads.

Seek times have typically been minimized through the application of relatively large amounts of current to the coil during the acceleration and deceleration phases of a seek operation. Latency times have also been continually minimized through continued increases in the rotational speeds of the discs (which in some disc drives have reached 10,000 revolutions per minute).

A problem resulting from these improvements in disc drive seek performance, however, is the increase in the amount of heat that is generated within the drive. Particularly, the spindle motor used to rotate the discs is typically one of the largest sources of heat in the drive, and the amount of heat dissipated within the drive generally increases with increases in rotational speed of the discs and the amount of drag upon the discs. Moreover, after repetitive seeking, resistive power losses in the actuator coil of the voice coil motor tend to also generate significant amounts of heat within the drive. Because the coil is mechanically isolated from the magnetic circuit of the voice coil motor, over time the temperature of the coil can exceed that of the rest of the disc drive by several degrees, creating a localized "hot spot" within the disc drive.

It is well known that the amount of current that can be passed through an actuator coil is generally a function of the direct current (dc) resistance of the coil, which in turn generally increases proportionally with the temperature of the coil. Hence, as coil temperature increases, so does the resistance; thus, over time lesser amounts of current can be applied to the coil, which in turn generally increases the time required to move a selected head from an initial track to a destination track during a seek operation. Moreover, elevated voice coil motor temperatures with respect to ambient can further adversely affect the ability of the disc drive to achieve optimal levels of performance, as the field strength of the magnetic circuit of a voice coil motor is generally a function of temperature and generally weakens as temperature is increased. Thus, the localized heating of the magnetic circuit further tends to increase the seek time of a disc drive.

Additionally, elevated voice coil motor temperatures can result in the degradation of adhesive and insulative materials used in the construction of the voice coil motor. Such degradation can lead to internal contamination of the disc drive as well as to the shorting of the coil.

Accordingly, there is a continual need for improvements in the art whereby data transfer performance of a disc drive can be increased while accommodating problems associated with the generation of heat within the drive as higher levels of drive performance are obtained.

SUMMARY OF THE INVENTION

The present invention provides an apparatus and method for enhancing the convective cooling of a voice coil motor (VCM) of a disc drive in order to reduce the temperature of the VCM during extended periods of disc drive operation. Generally, in accordance with the preferred embodiments of the present invention a portion of an air flow established by the rotating discs of the disc drive is diverted from the discs and is directed so as to pass over the coil of the VCM.

In accordance with a first preferred embodiment of the present invention, an air foil is provided to support first and second magnetic paths of the magnetic circuit of the VCM, the first and second magnetic paths each comprising a permanent magnet and a magnetically permeable pole piece. The air foil is provided with a leading edge positionable adjacent a disc stack of the disc drive, a shroud surface extending from the leading edge and adjacent a portion of the outer diameter of the disc stack and a diverter surface extending from the leading edge at an angle with respect to the shroud surface.

During operation of the disc drive, the air foil operates to divert a portion of the air flow established by the rotation of the disc stack to the VCM to convectively cool the same. The disc drive preferably further comprises a base deck to which the disc stack and the magnetic circuit are mounted, the base deck including a shroud portion adjacent portions of the outer diameter of the disc stack. The shroud portion of the base deck further preferably includes a baffle point proximate to the air foil so that a gap is formed therebetween, the diverted air being directed through the gap to the VCM.

An alignment fixture is also disclosed to facilitate assembly of the magnetic circuit. The alignment fixture generally comprises a base surface, an alignment drum and an alignment pin which are utilized to correctly align the air foil for use in the disc drive.

In alternative preferred embodiments, a recirculation filter of the disc drive is disposed in the path of the diverted air between the VCM and the disc stack. Additionally, features in the form of ramps can be provided in the disc drive base deck and top cover to further define the path taken by the diverted air so that the air is more directly channeled to the coil. Finally, an alternative diversion channel is disclosed, the diversion channel passing through the shroud of the base deck so as to divert the air from the disc stack to the VCM.

These and various other features as well as advantages which characterize the present invention will be apparent from a reading of the following detailed description and a review of the associated drawings.

BRIEF DESCRIPTION OF THE DRAWINGS

FIG. 3 shows a partial cross-sectional, elevational view of the magnetic circuit of FIG. 2 in conjunction with the disc stack and base deck of FIG. 1, as would be generally viewed along the view 3—3 of FIG. 1.

FIG. 4 illustrates the magnetic circuit in conjunction with an alignment fixture used to assemble the magnetic circuit of FIG. 2.

FIG. 10 provides another preferred embodiment of the present invention, generally comprising the disc drive of FIG. 1 with the placement of a recirculation filter in the path taken by the diverted air.

DETAILED DESCRIPTION OF THE PREFERRED EMBODIMENT

Figure 1:
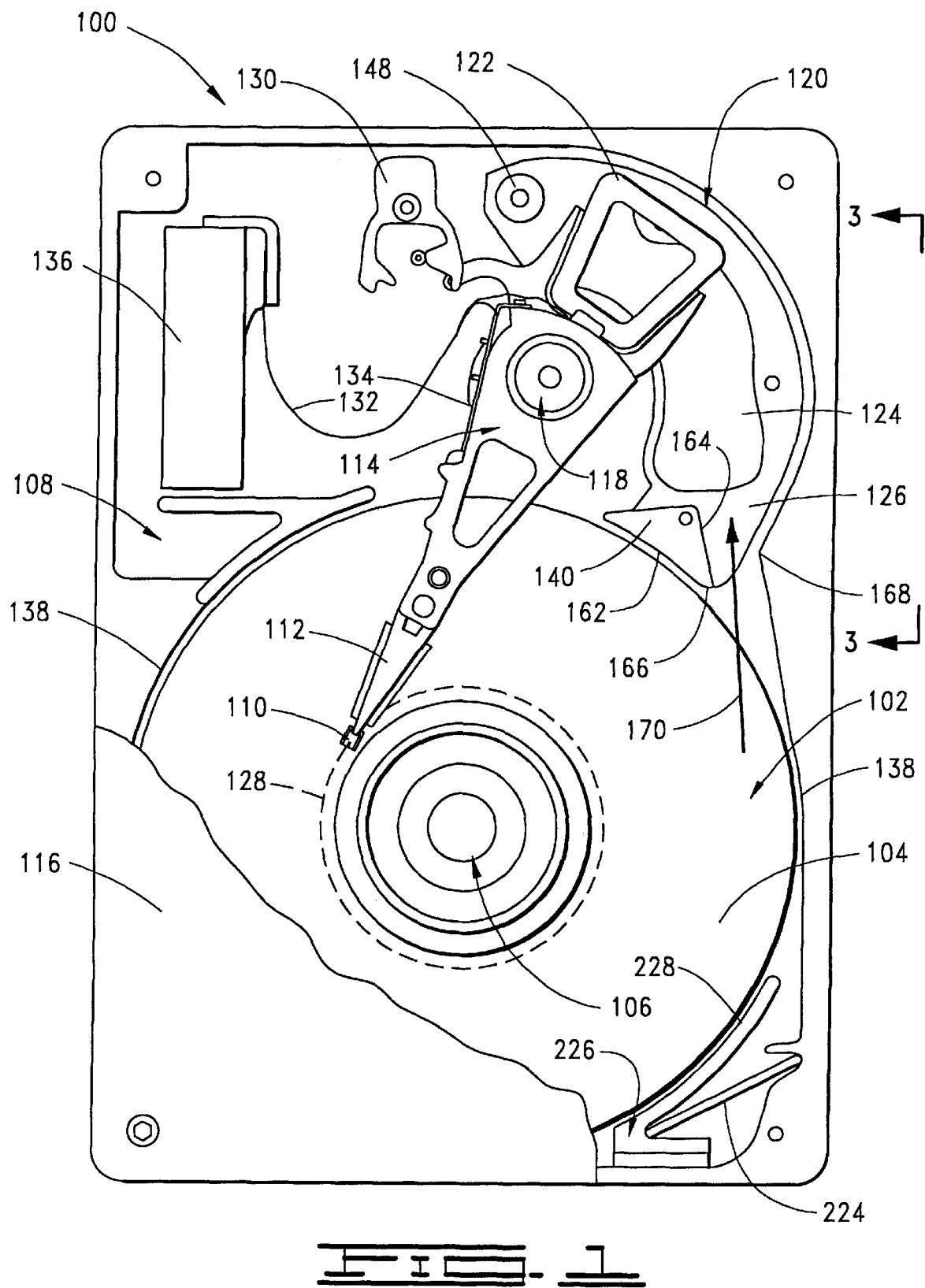
FIG. 1 is a top plan view of a disc drive including an air foil constructed in accordance with a first preferred embodiment of the present invention.

Referring now to the drawings and particularly to FIG. 1, shown therein is a disc drive 100 generally constructed in accordance with the first preferred embodiment of the present invention. It will be understood that a variety of alternative preferred embodiments for the disc drive 100 will be discussed below in turn and that several of the features disclosed may be readily combined as desired, depending upon the requirements of a given application. Accordingly, for purposes of clarity the reference numeral 100 will be used throughout to identify the top level disc drive assembly for each of the disclosed embodiments.

The disc drive 100 of FIG. 1 generally includes a disc stack 102 which, in turn, comprises a plurality of discs 104 upon which digital data is magnetically stored. To this end, the discs 104 are mounted to a spindle motor 106 for rotation relative to a base deck 108 about an axis that extends through the centers of the discs 104 so that the data can be stored as patterns of magnetization of a surface medium along circular tracks (not separately designated) that are defined on the discs 104. The magnetization of the tracks is effected by heads 110 that are mounted on the ends of flexures 112 of an actuator assembly 114. Although not shown in FIG. 1, it will be understood that each surface of the discs 104 has associated with it a corresponding head 110. Moreover, a top cover 116 (shown in partial cut-away fashion) cooperates with the base deck 108 in a conventional manner to provide a nominally sealed internal environment for the disc drive 100.

Each of the flexures 112 extends into the disc stack 102 to support the corresponding head 110 adjacent the surface of the associated disc 104 and positions the head 110 in radial alignment with a desired track. The actuator assembly 114 pivots about a bearing assembly 118 mounted to the base deck 108 so as to enable the positioning of the heads 110 at desired radial locations of the disc 104 accordingly.

The pivotal movement of the actuator assembly 114 is controlled by a voice coil motor (VCM) 120 which comprises a coil 122 and a magnetic circuit (not separately designated) having a pair of permanent magnets and corresponding pole pieces, such as shown in FIG. 1 at 124 and 126, respectively. It will be readily understood that the magnetic circuit further includes a second permanent magnet and corresponding pole piece which are disposed above the first permanent magnet 124 and pole piece 126, but such are not shown in FIG. 1 to more clearly facilitate the present discussion.

As will be recognized, the coil 122 is immersed in the magnetic field established by the magnetic circuit. Thus, when current is passed through the coil 122, an electromagnetic field is set up which interacts with the magnetic field of the magnetic circuit so as to cause the coil 122 to move relative to the magnetic circuit. As the coil 122 moves, the actuator assembly 114 pivots about the bearing assembly 118 and the heads 110 radially traverse the surfaces of the discs 104.

At such time that operation of the disc drive 100 is suspended, the heads 110 are moved to landing zones 128 at the inner diameters of the discs 104 and the actuator assembly 114 is secured by a conventional latch assembly 130.

A flex assembly 132 provides the requisite electrical connection paths for the actuator assembly 114 while allowing pivotal movement of the actuator assembly 114 during operation. The flex assembly includes a printed circuit board 134 to which head wires (not shown) are connected, the head wires being routed along the flexures 112 to the heads 110. The printed circuit board 134 typically includes circuitry for controlling the write currents applied to the heads 110 during a write operation and for amplifying read signals generated by the heads 110 during a read operation. Wires for the coil 122 are also attached to the flex assembly 132 as shown.

The flex assembly 132 terminates at a flex bracket 136 for communication through the base deck 108 to a disc drive printed circuit board (not shown) mounted to the bottom side of the disc drive 100.

During disc drive operation the spindle motor 106 rotates the discs 104 at a constant high speed so as to present all the data storage locations within a particular track to the heads 110 for the reading or writing of data. As the discs 104 spin, frictional forces impart a velocity to the boundary layer air surrounding the discs 104. This velocity propagates throughout the volume of air within the disc stack 102, inducing a general positive profile air flow from the rotating discs 104 in the direction of rotation of the discs 104. As will be recognized, the heads 110 are provided with aerodynamic features that cause the heads 110 to fly in close proximity to the surfaces of discs 104 as a result of this air flow.

The air flow is generally constrained within a shroud 138 which is formed as a portion of the base deck 108, the shroud 138 providing an arcuate enclosure adjacent portions of the outer edge of the disc stack 102. Thus, the shroud 138 generally operates to minimize windage power losses of the spindle motor 106 and to present a more uniform air flow for the heads 110.

In accordance with the first preferred embodiment of the present invention, as shown in FIG. 1 the voice coil motor 120 is further provided with an air foil 140, which preferably comprises a generally triangularly shaped spacer member fabricated from a rigid, magnetic material such as steel. As discussed in greater detail below, the air foil 140 provides mechanical support for the magnetic circuit within the disc drive 100, operates as a shroud over a portion of the circumference of the disc stack 102 and diverts a portion of the air flow generated by the spinning discs 104 to the voice coil motor 120 in order to enhance the convective cooling of the coil 122 and the magnetic circuit.

Figure 2:
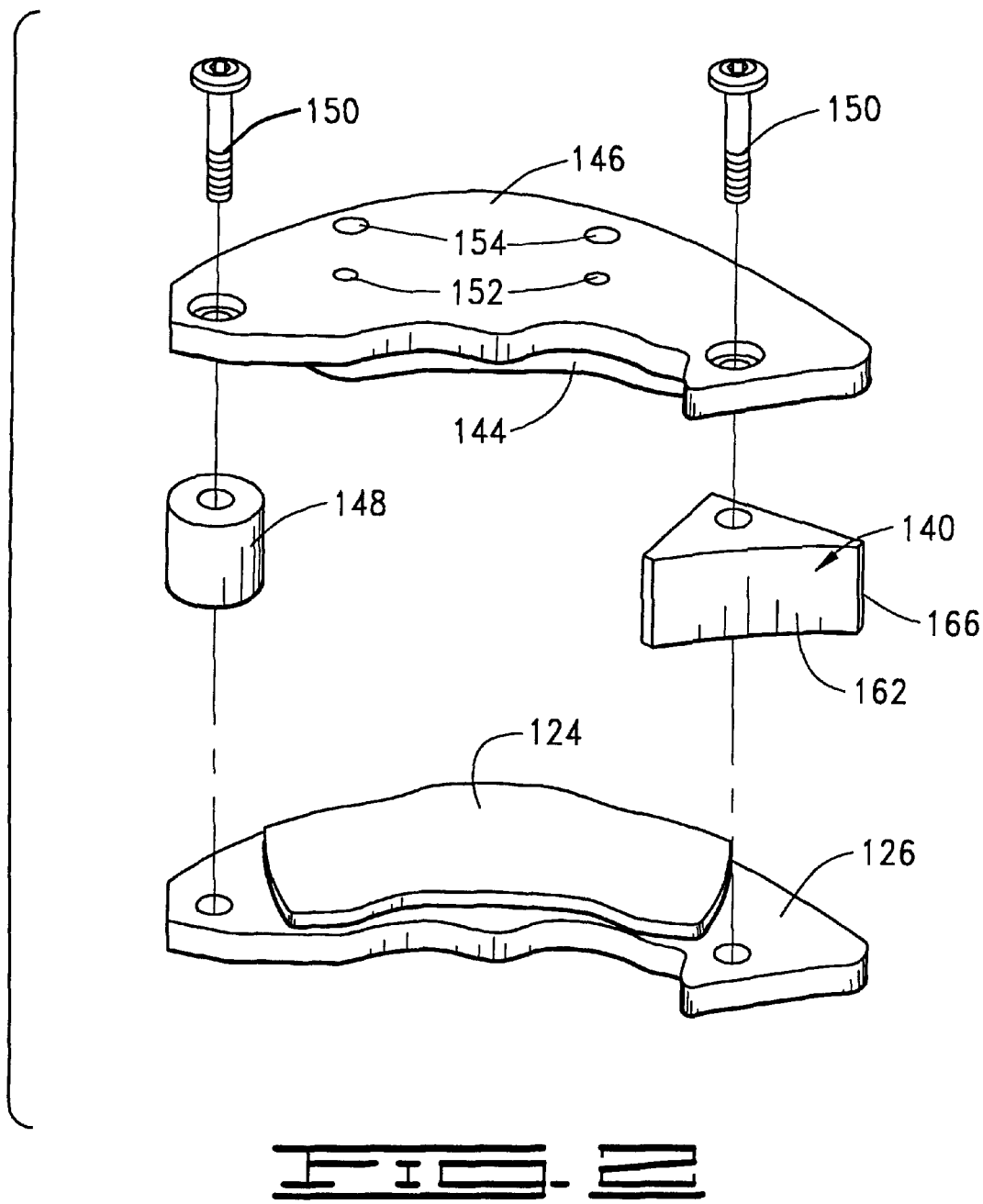
FIG. 2 provides an isometric, partially exploded view of the magnetic circuit of FIG. 1, showing the air foil of FIG. 1 in greater detail.

Referring now to FIG. 2, shown therein is an isometric, partially exploded view of the magnetic circuit of FIG. 1. More particularly, FIG. 2 shows the magnetic circuit to comprise the first permanent magnet and pole piece 124, 126 of FIG. 1, as well as a second permanent magnet and pole piece 144, 146 respectively (which as will be recalled were omitted from FIG. 1 for purposes of clarity). The pole pieces 126, 146 are mechanically separated and supported by way of the air foil 140 as well as by a cylindrically shaped support piece 148.

Fasteners 150 are thus inserted as shown through corresponding holes (not separately designated) in the pole pieces 126, 146, the air foil 140 and the support piece 148 to secure these components of the magnetic circuit into a completed subassembly. Although not shown in FIG. 2, fasteners are likewise inserted into holes (denoted at 152) of the pole pieces 126, 146 to secure the pole pieces 126, 146 to the base deck 108 and top cover 116, respectively, in the disc drive 100. Tooling alignment holes (designated at 154) are also provided for use during the assembly process to facilitate proper alignment of the pole pieces 126, 146 and the air foil 140, as discussed below. For reference, FIG. 3 provides an elevational view of the assembled magnetic circuit of FIG. 2 as would be generally viewed from a vantage point indicated along view 3—3 in FIG. 1 (it will be recognized that FIG. 3 includes the second permanent magnet and pole piece 144, 146 which were omitted from FIG. 1).

From a review of FIGS. 1–3, it will be readily understood that the air foil 140 is provided with a shroud surface 162 disposed closely adjacent the outer diameter of the disc stack 102, the shroud surface 162 operating to retain portions of the air flow generated by the rotating discs 104 within the disc stack 102 in a manner similar to that described above by the shroud 138 of the base deck 108. The air foil 140 further includes a diverter surface 164 which extends from a leading edge 166 of the air foil 140 at an angle with respect to the shroud surface 162.

Referring again to FIG. 1, the shroud 138 juttingly terminates to form a baffle 168 at a point proximate to the air foil 140. A gap is thereby formed between the baffle 168 and the leading edge 166 of the air foil 140, the gap causing the channeling of a portion of the air flow of the disc stack 102 toward the VCM 120 along a path that is generally tangential to the disc stack and is denoted by arrow 170. More particularly, the shapes and relative locations of the air foil 140 and the baffle 168 are such as to form a channel to the VCM 120, the channel providing a pressure drop across the face of the gap in accordance with the well-known Venturi effect. As will be recognized, the diverted air will pass over the coil 122 and the magnetic circuit, convectively cooling the same.

The amount of air diverted to the VCM 120 will depend upon a variety of factors, including the relative distance between the baffle 168 and the air foil 140 and the relative size and angles of the surfaces 162, 164 of the air foil (i.e., the "angle of attack" of the air foil 140 with respect to the air flow established by the disc stack 102). Generally, however, it will be recognized that there will be an optimal amount of air that can be diverted to cool the VCM 120. At some point, diverting too much air may actually make things worse; that is, diverting too much air can result in greater amounts of heat being dissipated by the spindle motor 106, as larger amounts of current will be required by the spindle motor 106 to rotate the disc stack 102 as additional amounts of drag are applied to the disc stack 102 through the diverted air.

Referring now to FIG. 4, shown therein is a top plan view of the magnetic circuit of FIGS. 1–3, generally illustrating the preferred manner in which the magnetic circuit is assembled. For reference, FIG. 4 provides a representation of the second pole piece 146, under which are dotted-line representations of the air foil 140, the second permanent magnet 144, the support piece 148 and the fasteners 150 used to secure these components together as discussed above.

Figure 5:
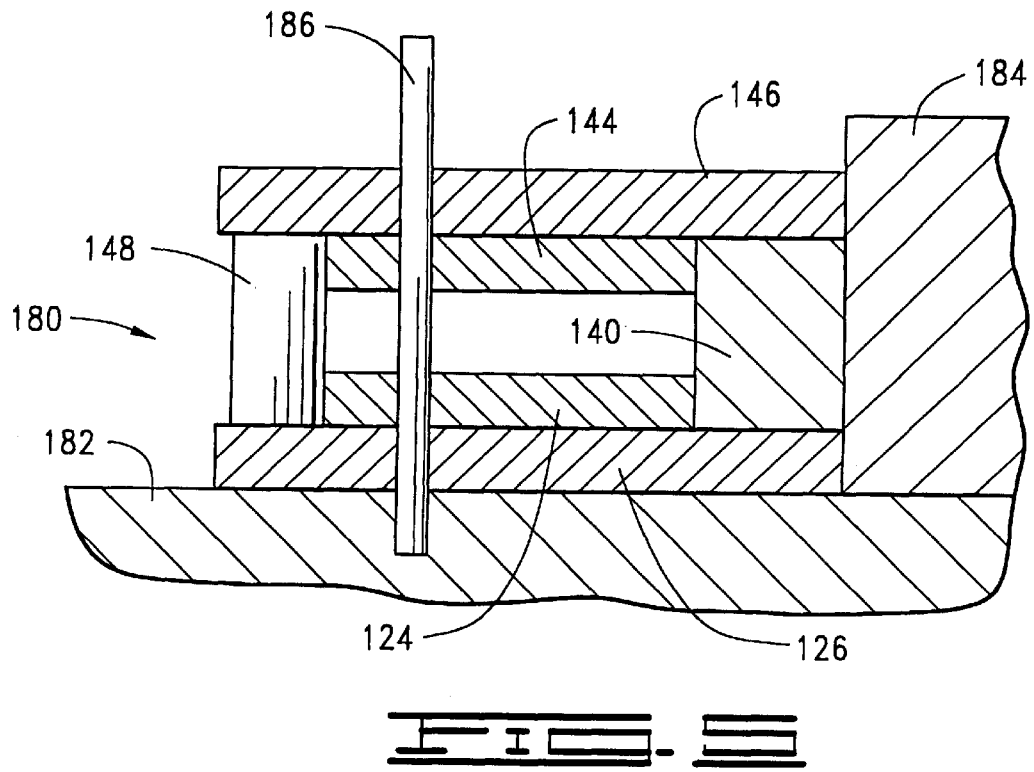
FIG. 5 provides a partial cross-sectional, elevational view of the magnetic circuit and alignment fixture of FIG. 4.
Figure 6:
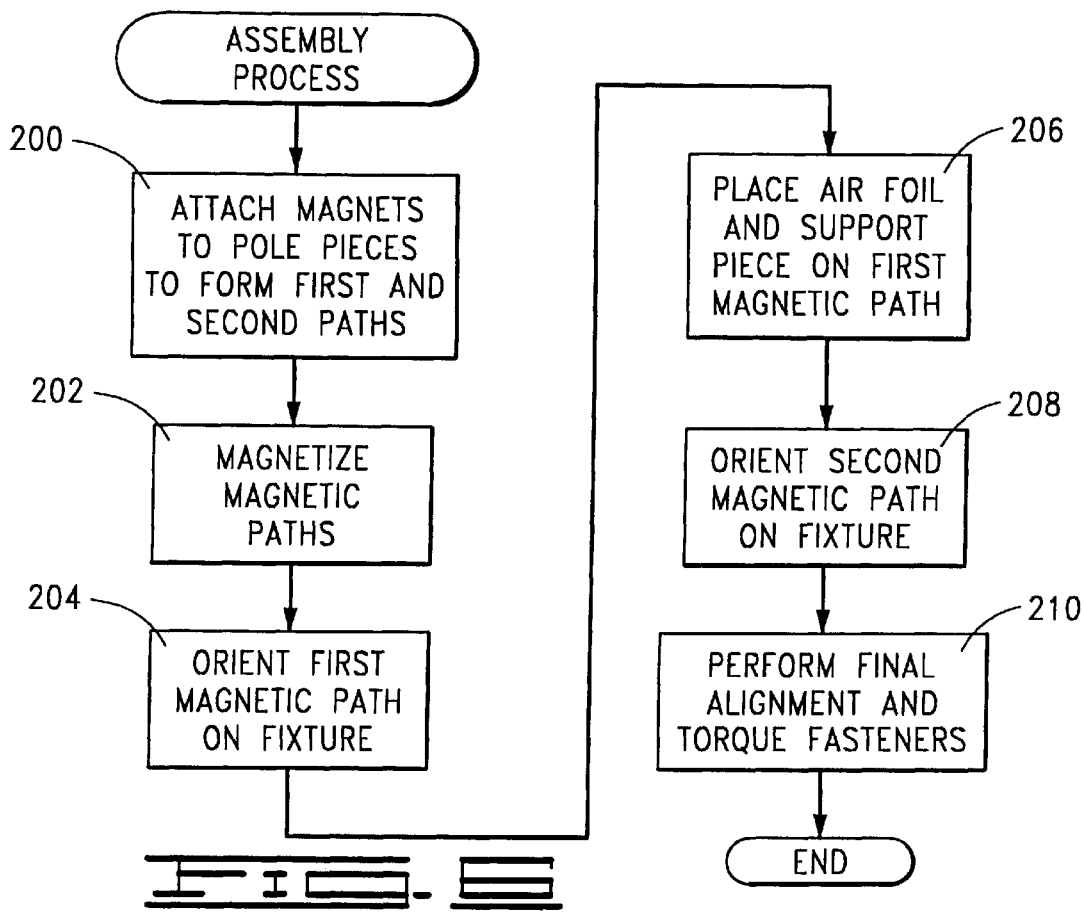
FIG. 6 provides a generalized flow chart illustrating the steps used to assemble the magnetic circuit in accordance with the first preferred embodiment.

The magnetic circuit is assembled using an alignment fixture (denoted generally at 180) comprising a base surface 182, an alignment drum (a portion of which is shown at 184)

and an alignment pin 186. As described below, the alignment drum 184 is utilized to obtain the correct rotational alignment of the air foil 140 with respect to the pole pieces 126, 146. Moreover, for purposes of the following discussion, FIG. 5 provides a cross-sectional, elevational view of the magnetic circuit and the alignment fixture 180 of FIG. 4; FIG. 6 provides a generalized flow chart illustrating the assembly steps utilized to assemble the magnetic circuit.

To assemble the magnetic circuit, as shown by block 200 of FIG. 6 the permanent magnets 124, 144 are first attached in a conventional manner to the corresponding pole pieces 126, 146 using an adhesive suitable for use within the disc drive 100. In the preferred embodiment, the permanent magnets 124, 144 are initially procured in a non-magnetized state and possess a neodymium-iron-boron composition; for reference, a suitable source is Shin Etsu of San Jose, Calif. Once the permanent magnets 124, 144 are attached to the corresponding pole pieces 126, 146, the subassemblies are magnetized using a conventional magnetizer in which large electromagnetic fields are applied to the permanent magnets 124, 144 and pole pieces 126, 146, as indicated by block 202 of FIG. 6.

Once magnetized, the first permanent magnet 124 and pole piece 126 (hereinafter "first magnetic path") are placed onto the alignment fixture 180, as shown by block 204 of FIG. 6. That is, with reference to FIGS. 4 and 5, the alignment pin 186 is inserted into the corresponding alignment hole 154 and the magnetic path is positioned so as to rest on the base surface 182. Although two alignment pins could be used, in the preferred embodiment only the one alignment pin 186 is used, so that the first magnetic path can be rotated until the first pole piece 126 comes to rest against the alignment drum 184.

Next, as indicated by block 206 in FIG. 6, the air foil 140 and the support piece 148 are placed onto the respective locations on the first magnetic path, as generally shown in FIG. 2. Alignment of the second permanent magnet 124 and pole piece 126 (hereinafter "second magnetic path") then takes place through the insertion of the alignment pin 186 through the corresponding alignment hole 154 of the second pole piece 146 and the positioning of the second magnetic path onto the air foil 140 and the support piece 148, as indicated by block 208.

The fasteners 150 (FIG. 2) are then installed, block 210. However, the fasteners 150 are not finally torqued until the desired alignment of the magnetic circuit, including the alignment of the shroud surface 162 of the air foil 140 against the alignment drum 184, is achieved. Once the fasteners have been finally torqued, the magnetic circuit is removed from the alignment fixture 180 for subsequent installation into the disc drive 100.

Figure 7:
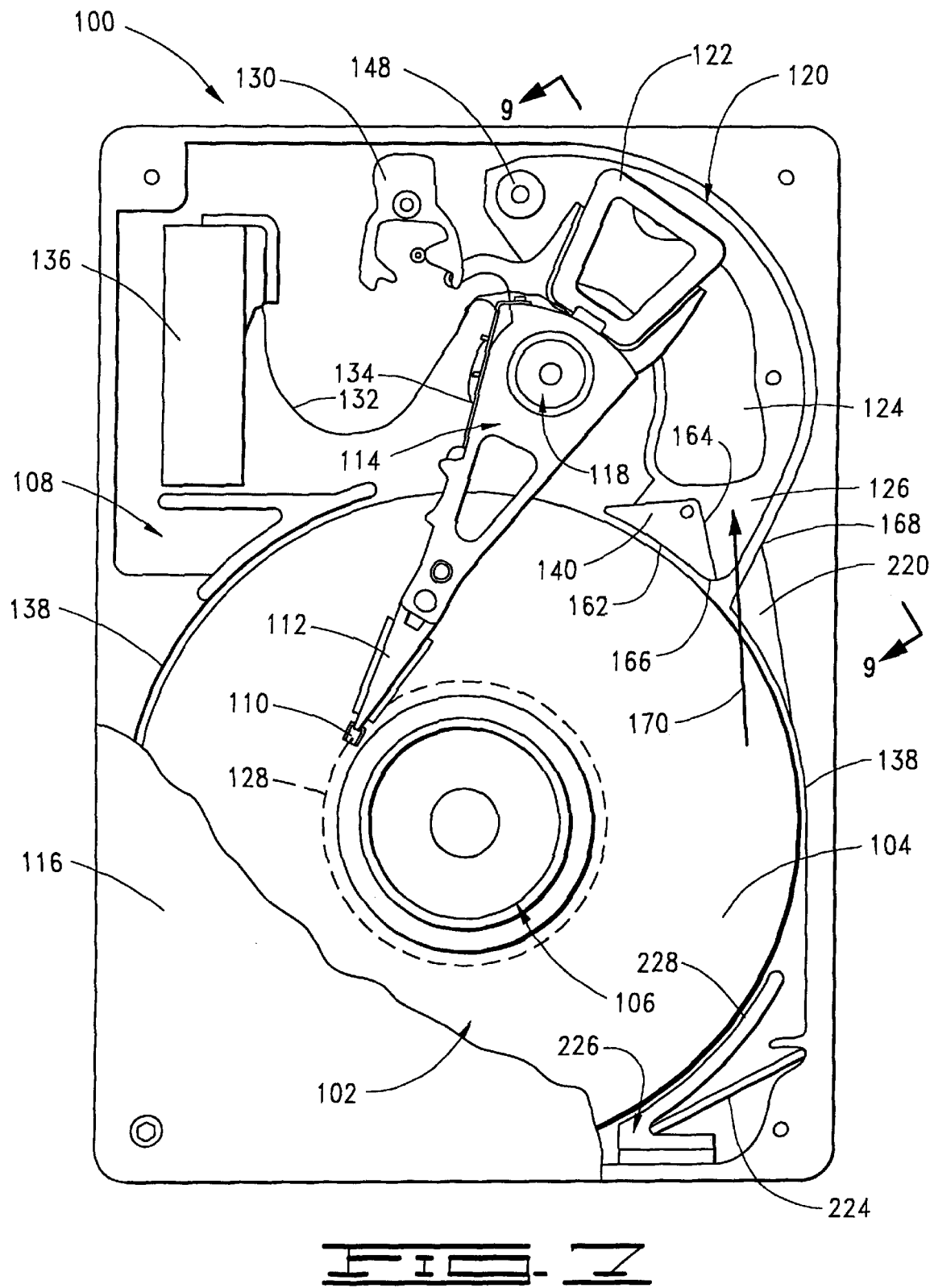
FIG. 7 illustrates a second preferred embodiment of the present invention, generally comprising the disc drive of FIG. 1 with the additional use of a diverter ramp extending upwardly from the disc drive base deck, the diverter ramp further defining the path taken by the diverted air so that the air is more directly channeled to the coil.

Having now concluded the discussion of the first preferred embodiment and the preferred manner for assembling the same with respect to FIGS. 1–6, reference is now made to FIG. 7 which illustrates the second preferred embodiment of the present invention. More particularly, FIG. 7 shows the disc drive 100 of FIG. 1 to be further provided with a diverter ramp 220 which operates to further channel the diverted air to the coil 122 of the VCM 120.

The diverter ramp 220 extends upwardly from the base deck 108 at an angle and terminates at an elevation substantially that of the top surface of the first permanent magnet 124. Thus, as air is diverted from the disc stack 102 along path 170, the air is both tangentially and axially diverted with respect to the disc stack 102. The diverter ramp 220 is disposed adjacent a portion of the shroud 138 as shown and can be provided as a separate part or can be integrated into the casting that forms the base deck 108.

Figure 8:
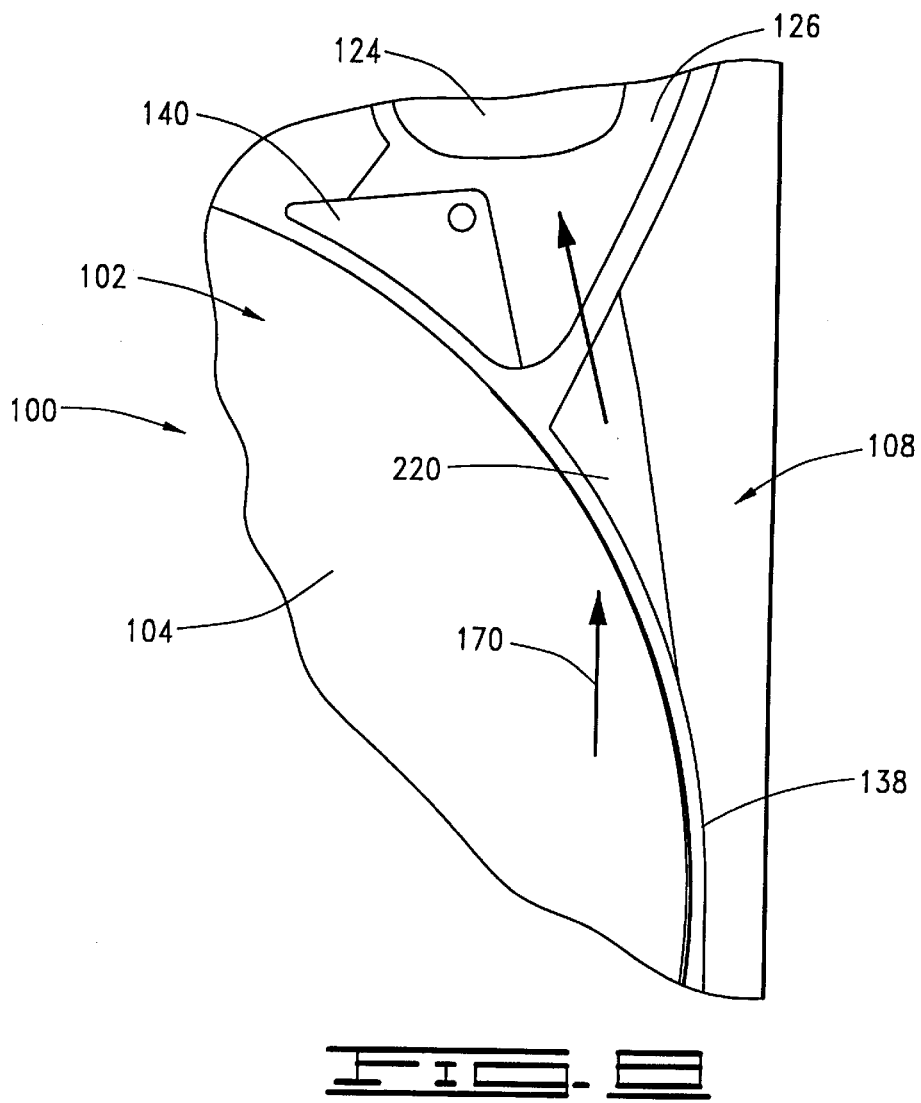
FIG. 8 shows the diverter ramp of FIG. 7 in greater detail.
Figure 9:
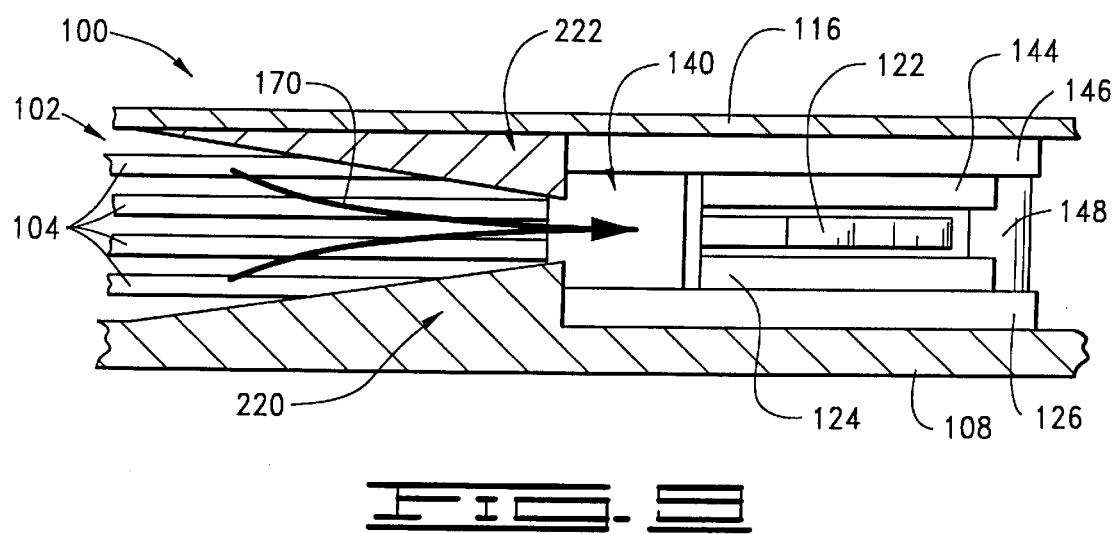
FIG. 9 provides a partial cross-sectional, elevational view of the magnetic circuit of FIGS. 7 and 8, illustrating in greater detail the diverter ramp of FIGS. 7 and 8 as well as a second diverter ramp attached to the top cover of the disc drive.

FIG. 8 illustrates the diverter ramp 220 (and immediately associated portions of the disc drive 100) in greater detail. FIG. 9 provides a partial cross-sectional, elevational view of the diverter ramp 220 as would be generally seen along view 9—9 in FIG. 7 (along with certain elements that were omitted from FIG. 7 for purposes of clarity). Additionally, a second diverter path 222 can be extended downwardly from the top cover 116 to further channel the air to the coil 122, as shown in FIG. 9.

Having concluded the discussion of FIGS. 7–9, reference is now briefly made back to FIG. 1, wherein is shown a recirculation filter 224 adjacent the disc stack 102. As will be recognized, a portion of the air flow established by the rotation of the disc stack 102 of FIG. 1 is diverted around a recirculation support member 226 supporting the recirculation filter 224 and will be caused to pass through the recirculation filter 224 in a conventional manner. The recirculation filter 224 operates to trap airborne contaminating particulates so as to prevent such from interfering with the operation of the disc drive 100. Although the recirculation support member 226 is provided with an inner shroud surface 228 disposed closely adjacent the disc stack 102 so as to minimize windage losses, it will be recognized that some amount of drag will be applied to the spindle motor 106 as a result of the air flow that passes around the recirculation support member 226 and through the recirculation filter 224.

Accordingly, FIG. 10 shows another preferred embodiment of the present invention which can be advantageously implemented in conjunction with the previously discussed embodiments. Particularly, FIG. 10 illustrates the disc drive 100 with the additional placement of a recirculation filter 230 in the path taken by the diverted air as it passes to the VCM 120. The recirculation filter 230 is generally similar in construction and operation to the recirculation filter 224 of FIG. 1, except that the recirculation filter 230 is sized to fit within the gap between the shroud 138 and the air foil 140 as shown and attached to the base deck 108 in a suitable manner. An important advantage associated with the location of the recirculation filter 230 in FIG. 10 is that improved shrouding of the disc stack 102 can be achieved through the elimination of the shroud opening necessary to accommodate the conventional recirculation filter 224 of FIG. 1.

Figure 11:
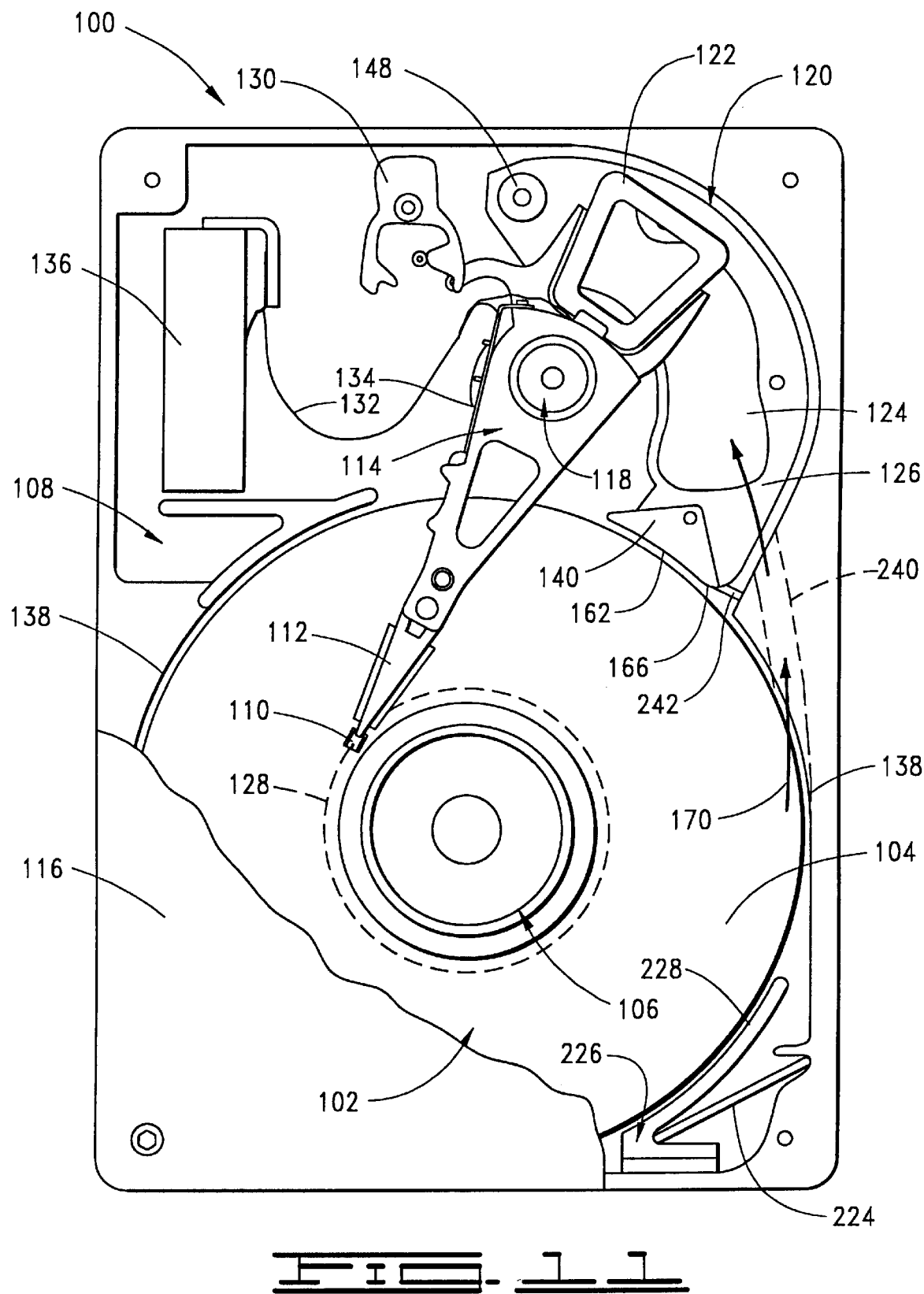
FIG. 11 illustrates yet another preferred embodiment of the present invention, generally comprising the disc drive of FIG. 1 with the alternative use of a diversion channel disposed in the base deck so as to divert a portion of the air flow established by the rotation of the disc stack to the VCM.

Referring now to FIG. 11, shown therein is yet another preferred embodiment of the present invention which comprises the use of a channel (denoted in broken lines at 240) extending through portions of the shroud 138 of the base deck 108, the channel directing a portion of the air flow (along path 170) from the disc stack 102 to the VCM 120. The channel 240 can be cut or formed as a portion of the base deck casting, depending upon the requirements of a particular application.

Further, as shown in FIG. 11 the shroud 138 extends to a point closely adjacent the air foil 140. A sealing material 242 (such as a gasket or the like) can be advantageously used to form a seal between the shroud 138 and the air foil 140 to further reduce windage losses at this point. Although not shown in FIG. 11, windage losses can be further decreased by placing the recirculation filter 230 (FIG. 10) at the terminal end of the channel 240 so that the diverted air passes through the recirculation filter 230 before reaching the VCM 120.

It will be recognized that the air foil 140 discussed above with reference to FIGS. 1–10 is particularly suitable for use in the embodiment disclosed in FIG. 11, as the shroud surface 162 of the air foil 140 operates to shroud the disc stack 102 in the area adjacent the VCM 120 and the diverter surface 164 operates to further divert the air exiting the channel 240 towards the coil 122. However, other configurations are readily contemplated; for example, the base deck 108 could be alternatively provided with a shroud surface that extends around the disc stack 102 along the path of the shroud surface 162 of the air foil 140. This would eliminate the need to seal any gap between the shroud 138 and the air foil 140 and would allow the use of a more conventional support member (such as the cylindrical support piece 148) to support the magnetic circuit at this location.

Accordingly, in view of the foregoing it will be recognized that the present invention provides an apparatus and method for enhancing the convective cooling of a VCM (such as 120) of a disc drive (such as 100) through the diverting of a portion of an air flow established by the rotation of a disc stack (such as 102) of the disc drive to the VCM. In one of the disclosed, preferred embodiments, an air foil (such as 140) is disposed adjacent a disc (such as 104) of the disc drive. The air foil includes a leading edge (such as 166) disposed adjacent the outer diameter of the disc, a shroud surface (such as 162) extending from the leading edge and along a portion of the outer diameter of the disc and a diverter surface (such as 164) extending from the leading edge at an angle with respect to the shroud surface, the air foil directing a portion of an air flow established by the rotation of the disc to the VCM in order to cool the same.

In additional preferred embodiments, diverter ramps (such as 220, 222) are provided to further channel the diverted air to the coil (such as 122) of the VCM; a recirculation filter (such as 230) is disposed in the path (such as 170) of the diverted air; and a channel (such as 240) is alternatively provided through the side of the shroud wall (such as 138) of the base deck (such as 108) of the disc drive in order to pass a portion of the air flow over the VCM.

For purposes of the appended claims, it will be recognized that the phrase "first magnetic path" includes a source of magnetic flux, such as the permanent magnet 124 described above. Moreover, it will be recognized that the phrase "second magnetic path" includes a magnetically permeable member, such as the second permanent magnet 144 or the second pole piece 146 described above. Although a two magnet, two pole piece configuration has been disclosed herein, the claimed invention will be understood to cover other configurations, such as for example a one magnet, two pole piece configuration.

Finally, it will be recognized that for purposes of the appended claims the phrase "disc stack" will be understood to cover just one disc as well as a plurality of discs.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the spirit of the invention disclosed and as defined in the appended claims.

What is claimed is:

1. An air foil for use in a voice coil motor of a disc drive to direct cooling air from an air flow established by rotation of a disc to the voice coil motor, the air foil comprising:
    a leading edge;
    a shroud surface extending from the leading edge and running in a curvilinear direction, wherein the shroud surface is disposed adjacent a portion of the circumference of the disc of the disc drive to operate as a shroud for the disc;
    a diverter surface extending from the leading edge, the diverter surface diverting the cooling air to the voice coil motor; and
    wherein the air foil supports a first magnetic path of the voice coil motor relative to a second magnetic path of the voice coil motor.

2. The air foil of claim 1, further comprising a connecting surface connecting distal edges of the shroud surface and the diverter surface so that the air foil has a substantially triangular shape.

3. The air foil of claim 2, further comprising a central opening for accommodating a fastener used to secure the first and second magnetic paths.

4. A magnetic circuit for a voice coil motor of a disc drive having a disc rotatable about a disc axis in a disc plane, the disc drive further having an actuator assembly adjacent the disc, the actuator assembly including a coil for magnetically interacting with the magnetic circuit in order to position the actuator assembly relative to the disc, the magnetic circuit comprising:
    a first magnetic path disposed in a plane parallel with the disc plane, the first magnetic path generating magnetic flux of predetermined orientation and nominal field strength;
    a second magnetic path disposed adjacent to and parallel with the first magnetic path, a substantial portion of the magnetic flux of the first magnetic path passing through the second magnetic path, the first and second magnetic paths separated by a gap in which the coil is inserted;
    an air foil disposed between the first and second magnetic paths, the air foil supporting the second magnetic path relative to the first magnetic path, the air foil comprising:
        a leading edge adjacent the disc;
        a shroud surface extending from the leading edge and running adjacent the disc, the shroud surface having a radius substantially that of the disc and operating as a shroud for the disc; and
        a diverter surface extending from the leading edge, the diverter surface diverting air flow established by the rotation of the disc towards the magnetic circuit to cool the magnetic circuit.

5. The magnetic circuit of claim 4, wherein the first magnetic path comprises a magnetically permeable pole piece and a permanent magnet disposed on the pole piece.

6. The magnetic circuit of claim 4, wherein the second magnetic path comprises a magnetically permeable pole piece.

7. A disc drive, comprising:
    a rotatable disc stack having a circumference;
    a controllably positionable actuator assembly adjacent the disc stack, the actuator assembly including a coil; and
    a magnetic circuit adjacent the coil, the magnetic circuit comprising:
        a first magnetic path generating magnetic flux of predetermined orientation;
        a second magnetic path disposed adjacent to and parallel with the first magnetic path, a substantial portion of the magnetic flux of the first magnetic path passing through the second magnetic path, the coil disposed in a gap between the first and second magnetic paths; and
        an air foil disposed between the first and second magnetic paths, the air foil supporting the second magnetic path relative to the first magnetic path, the air foil comprising:

a leading edge adjacent the disc;

a shroud surface extending from the leading edge and running adjacent a portion of the circumference of the disc stack, the shroud surface operating as a shroud for the disc stack; and a diverter surface extending from the leading edge at an angle with respect to the shroud surface, the diverter surface diverting air from an air flow established by the rotation of the disc stack to cool the coil during operation of the disc drive.

8. The disc drive of claim 7, further comprising a base deck supporting the disc stack, the actuator assembly and the magnetic circuit, the base deck including a shroud portion disposed adjacent the disc stack along at least a portion of the circumference of the disc stack.

9. The disc drive of claim 8, wherein the shroud portion of the base deck includes a baffle point proximate to the air foil, wherein a channel is established between the baffle point and the air foil, and wherein the diverted air passes through the channel to the coil.

10. The disc drive of claim 8, further comprising a diverter ramp extending upwardly from the base deck, the diverter ramp disposed adjacent a portion of the shroud for channeling the diverted air to the coil.

11. The disc drive of claim 7, further comprising a recirculation filter, the diverted air passing through the recirculation filter before reaching the coil.

* * * * *

UNITED STATES PATENT AND TRADEMARK OFFICE
CERTIFICATE OF CORRECTION

| | | |
|---|---|---|
| PATENT NO. | : 5,907,453 | Page 1 of 1 |
| DATED | : May 25, 1999 | |
| INVENTOR(S) | : Roy L. Wood, Phillip R. Ridenour, Steven S. Eckerd and Carl F. Adams | |

It is certified that error appears in the above-identified patent and that said Letters Patent is hereby corrected as shown below:

Title page,
Item [56], References Cited, replace "omitted" with -- 5,262,907 11/16/93 Duffy --

Column 10,
Lines 17-18, replace "of a disc drive having a disc…" with -- of a disc drive the disc drive having a disc… --.

Signed and Sealed this

Twenty-sixth Day of November, 2002

*Attest:*

*Attesting Officer*

JAMES E. ROGAN
*Director of the United States Patent and Trademark Office*